Sept. 4, 1945.    R. C. SWEET    2,383,997
GRAVITY METER
Filed Dec. 29, 1943
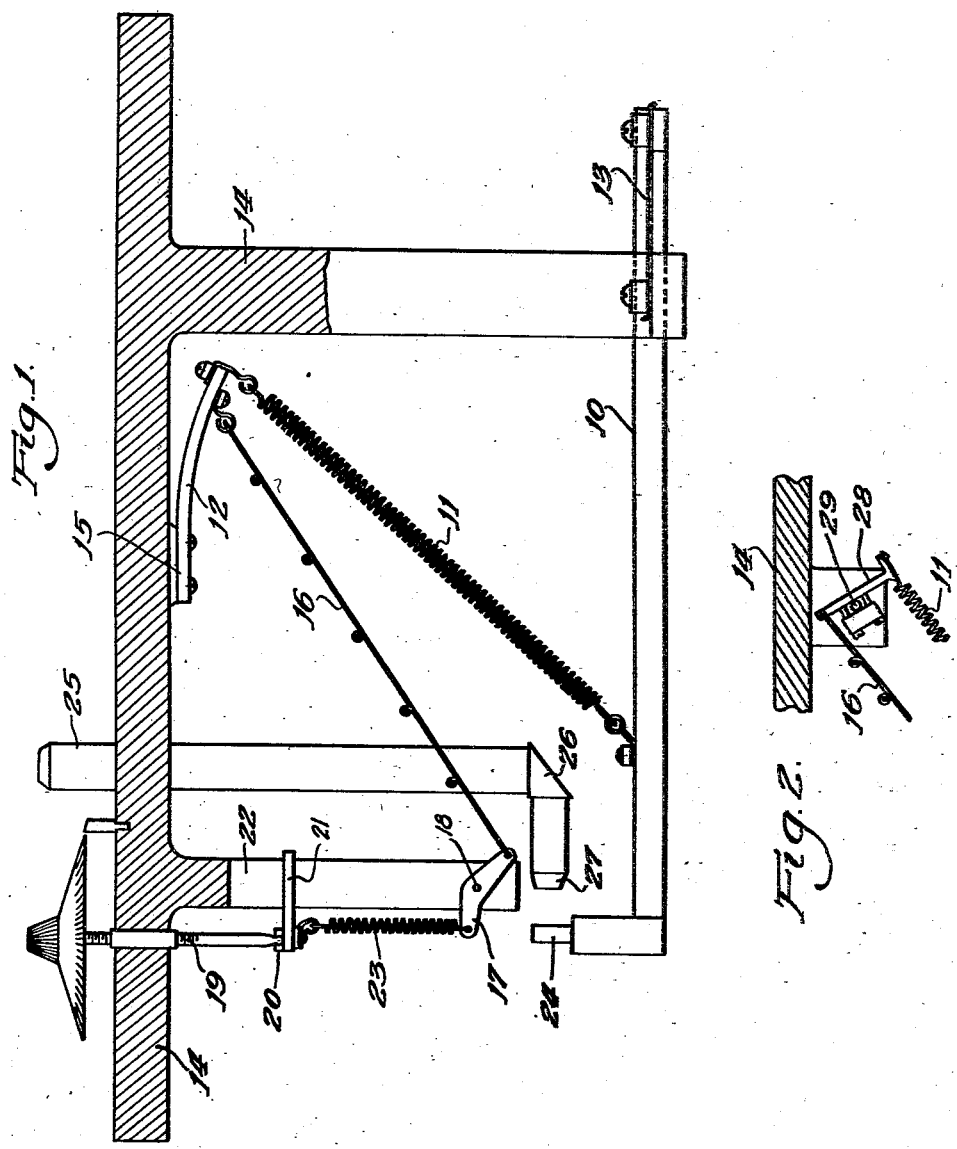
Inventor:
Reginald C. Sweet
By Youart H. Kerslake
Attorney:

UNITED STATES PATENT OFFICE 2,383,997

GRAVITY METER

Reginald C. Sweet, Tulsa, Okla., assignor to Stanolind Oil and Gas Company, Tulsa, Okla., a corporation of Delaware Application December 29, 1943, Serial No. 516,068

9 Claims. (Cl. 73—382)

The present invention relates to meters for determining differences in gravity between each of a plurality of spaced locations in an area. These meters are commonly called gravity meters and consist essentially of a gravity-responsive means or mass. The mass is elastically suspended in such a way that variations in the gravitational force from point to point on the earth's surface will cause it to be pulled downwardly to a greater or a lesser degree. Gravity meters are adapted to measure differences in the force exerted on the mass whereby valuable information regarding the subsurface strata can be deduced. Such information is highly valuable in prospecting for underground deposits, such as oil and certain minerals.

The object of the present invention is to provide a gravity meter capable of extremely delicate measurements, which meter is not only simple in construction and economical to build but is also easy to operate and capable of detecting very small differences in gravity.

The invention will be described in detail with reference to the accompanying drawing in which Figure 1 illustrates in elevation a gravity meter according to the present invention, and Figure 2 illustrates a modification of a portion of the gravity meter shown in Figure 1.

According to Figure 1 a gravity responsive means or mass 10 is supported approximately at its center of gravity by a main resilient means or spring 11 which is secured at its upper end to an elastic support member, such as a stiff leaf spring 12. Spring 11 is a zero-length spring, that is, it is wound in a pre-tensioned manner such that the force exerted by the spring is always substantially directly proportional to the length of the spring. Since the main spring is arranged at an angle to the vertical, which is preferably about 45°, thin non-extensible ligatures 13 are provided at the end of the mass 10 for preventing lateral movement of the mass with respect to a support 14. Although the filaments 13 will permit vertical movement of the mass it will normally remain in a substantially horizontal position since it is supported at its center of gravity. The elastic support member or leaf spring 12 is rigidly secured at one end 15 to the support 14. The main resilient means or spring 11 is secured to the opposite end of leaf spring 12 and is arranged at an angle thereto. A connecter 16 which preferably consists of a ligature is attached to the elastic support member 12 near the point of attachment of the main resilient means 11. The other end of said connecter 16 is attached to a bell crank lever 17 or the like which is supported on a transverse torsion fiber 18. The connecter 16 is arranged to run approximately parallel to the axis of the main spring 11. A calibrated micro adjustment screw 19 is provided, the lower end of which is connected through a ball and socket joint 20 to a sliding member 21 which is slidably mounted within a slot 22 of the support 14 to prevent rotation of the socket. The sliding member 21 is connected to one end of a reading spring 23 while the other end is secured to the bell crank lever 17. The mass 10 is provided with an extension 24 having an indicator mark such as a hair line thereon. A telescope arrangement for viewing the indicator mark is provided and consists of a scaled micrometer eye piece 25, a prism 26 and a microscope objective lens 27. By looking through the eye piece one is able to determine the exact position of the mass for the purpose of manipulating the calibrated micro adjustment screw 19.

The gravity meter as shown in the drawing is usually mounted in a closed case which is maintained at a uniform temperature, by means which are well known in the art, in order to prevent introducing various errors into the measurements due to changes in temperature.

In using the gravity meter, according to the present invention, to determine differences in gravity from one point to another, it is necessary to place the gravity meter in a true horizontal position. If the mass is not in its null position, thereby indicating that there is a difference in the gravity between the present location of the instrument and that location at which the last reading was taken, it will be necessary to turn the calibrated micro adjustment screw 19 so that the connecter 16 will vary the position of the elastic support member 12. When the elastic support member 12 is moved or flexed the position of mass 10 will be altered. By looking through the eye piece 25 one can determine when the mass 10 has been returned to its null position and the amount of force necessary to accomplish this adjustment may be determined from the calibrated micro adjustment screw 19. It has been found that the particular arrangement of springs and ligatures enables one to obtain a very fine reading of differences in gravity and that errors due to friction between moving parts of the device have been reduced to a minimum.

In Figure 2 the elastic support member comprises a torsion fiber mounting in place of the leaf spring 12. According to Figure 2 a lever or bar 28 is securely fixed to a torsion fiber 29. The main spring 11 is secured to one end of the bar 28 whereas the connecter 16 is secured to the other end of said bar. According to this modification the operation of the calibrated micro adjustment screw 19 is the reverse of that shown in Figure 1, since a reduction in tension of the connecter ligature 16 will result in a reduction in tension of the main spring 11, while in Figure 1 a reduction in tension of the connecter ligature 16 results in an increased tension in the main spring 11.

It is clear that various mechanical modifications may be contemplated by one skilled in the art and it is intended that such modifications shall come within the scope of the present invention. For example, the ball and socket joint 20 for connecting the calibrated micro adjustment screw 19 to the reading spring 23 can be replaced by other types of mechanical connections which would permit non-torsional movement of the reading spring 23 and the bell crank lever 17 can be replaced by any other type of lever serving the same purpose.

Having now described my invention what I claim is:

1. A gravity meter comprising a support, gravity-responsive means, an elastic support member for supporting said gravity-responsive means, a resilient means connecting said gravity-responsive means to said elastic support member, a micro-adjustment means mounted on said support, a second resilient means interconnecting said elastic support means and said micro-adjustment means, whereby determinable micro-adjustments in the position of said gravity-responsive means are obtained, and means for determining the position of said gravity-responsive means.

2. A gravity meter comprising a support, an elastic support member attached to said support, a gravity-responsive means, resilient means connected at one end to said gravity-responsive means at substantially the center of gravity of said gravity-responsive means and at the other end to said elastic support member at a point removed from the point of attachment of said elastic support member to said support, a second resilient means connected at one end to said elastic support member at a point removed from the point of attachment of said elastic support member to said support, micro-adjustment means connected to the other end of said second resilient means for making determinable minor adjustments in the position of said elastic support member through said second resilient means, and means for determining the position of said gravity-responsive means.

3. A gravity meter as claimed in claim 2 wherein said elastic support member comprises a flexible leaf spring.

4. A gravity meter as claimed in claim 2 wherein the elastic support means comprises a bar pivotally supported on a torsion fiber.

5. A gravity meter comprising a support, flexible support means attached at one end to said support, gravity-responsive means, a main resilient means attached at one end to said gravity-responsive means at substantially the center of gravity thereof and at its other end to the free end of said flexible support means, a linkage mechanism connected to said flexible support means at a point near the point of attachment of the main resilient means thereto, calibrated micro adjustment means mounted on said support, a reading spring connected at one end to said linkage mechanism and at the other end to said calibrated micro adjustment means, means for preventing rotational movement of said reading spring, and means for determining the position of said gravity-responsive means.

6. A gravity meter comprising a support, a flexible leaf spring attached at one end to said support, gravity-responsive means disposed in a substantially horizontal position, a main resilient means connected at one end to said gravity-responsive means at substantially the center of gravity of said gravity-responsive means and at the other end to the free end of said flexible leaf spring, said main resilient means forming an angle of about 45° with said gravity-responsive means, means connecting one end of said gravity-responsive means to said support for preventing lateral movement of said gravity-responsive means, a torsion fiber mounted on said support, a lever mounted on said fiber, a connecting ligature attached at one end to said flexible leaf spring at a point removed from the point of attachment of said spring to said support, the other end of said connecting ligature being attached to one arm of said lever, a reading spring attached to the other arm of said lever, means for applying small determinable forces to the other end of said reading spring and means for determining the position of said gravity-responsive means upon application of force to said reading spring.

7. A gravity meter comprising a support, a flexible leaf spring attached at one end to said support, a gravity-responsive mass disposed in a substantially horizontal position, a main spring extending upwardly from said mass at an angle of about 45° thereto, said main spring being attached at its lower end to said gravity-responsive mass at substantially the center of gravity of said mass and at its upper end to the free end of said flexible leaf spring, at least two thin non-extensible filaments connected to one end of said mass and to said support for preventing lateral movement of said mass, a bell crank lever pivotally mounted on said support, a ligature connected at its upper end to said flexible leaf spring at a point near the point of attachment of the main spring thereto and at the lower end to one arm of said bell crank lever, said main spring and said ligature forming substantially right angles with said flexible leaf spring, a calibrated micro adjustment screw mounted on said support, a non-rotatable follower disposed at the lower end of said micro adjustment screw, a reading spring extending between and connected to said follower and the other arm of said bell crank lever, a hair line on said mass, a telescope having a micrometer scale therein for use in combination with said hair line, whereby said mass may be placed at a determinable position upon proper adjustment of said calibrated micro adjustment screw.

8. A gravity meter comprising a support, a torsion fiber mounted on said support, a bar member mounted on said torsion fiber, gravity-responsive means, a main resilient means attached at one end to said gravity-responsive means at substantially the center of gravity of said gravity-responsive means and at its other end to one end of said bar member, a lever pivotally mounted on said support, a ligature connected at one end to the upper end of said bar member and at the lower end to one arm of said lever, calibrated micro adjustment means mounted on said support, a reading spring connected between the other arm of said lever and said calibrated micro adjustment means, whereby by adjustment of said calibrated micro adjustment means said gravity-responsive means may be placed in a determinable position, and means for preventing rotational movement of said reading spring.

9. A gravity meter comprising a support, a torsion fiber mounted on said support, a bar member mounted on said torsion fiber, a gravity-responsive means disposed in a substantially horizontal position, a main resilient means connected at one end at substantially the center of gravity of said gravity-responsive means and at the other end to the first end of said bar member, said main resilient means forming an angle of about 45° with said gravity-responsive means, at least two thin non-extensible filaments connected to one end of said gravity-responsive means and to said support for preventing lateral movement of said gravity-responsive means, a bell crank lever pivotally mounted on said support, a ligature connected at its upper end to the second end of said bar member and at the lower end to one arm of said bell crank lever, said main resilient means and said ligature forming substantially right angles with said bar member, a calibrated micro adjustment screw mounted on said support, a non-rotatable follower mounted at the lower end of said micro adjustment screw, a reading spring extending between and connected to said follower and the other arm of said bell crank lever, a hair line on said mass, a telescope having a micrometer scale therein for use in combination with said hair line whereby said mass may be placed in a determinable position upon proper adjustment of said calibrated micro adjustment screw.

REGINALD C. SWEET.